(12) United States Patent
Owen

(10) Patent No.: US 7,701,898 B2
(45) Date of Patent: Apr. 20, 2010

(54) SWITCH-IN OF CENTRALISED INFRASTRUCTURE FOR MANAGEMENT FOR WIRELESS COMMUNICATIONS

(75) Inventor: Russell N. Owen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 750 days.

(21) Appl. No.: 10/940,665

(22) Filed: Sep. 15, 2004

(65) Prior Publication Data

US 2006/0056364 A1    Mar. 16, 2006

(51) Int. Cl.
*H04W 4/00* (2006.01)

(52) U.S. Cl. .................................. 370/328; 455/435.1

(58) Field of Classification Search ................ 370/352, 370/351, 338, 328; 455/435.1–435.3
See application file for complete search history.

(56) References Cited

U.S. PATENT DOCUMENTS

| | | | |
|---|---|---|---|
| 6,493,552 B1 * | 12/2002 | Hicks | 455/435.2 |
| 6,546,425 B1 | 4/2003 | Hanson et al. | |
| 6,615,276 B1 | 9/2003 | Mastrianni et al. | |
| 6,701,378 B1 | 3/2004 | Gilhuly et al. | |
| 7,248,857 B1 * | 7/2007 | Richardson et al. | 455/413 |
| 2002/0036991 A1 * | 3/2002 | Inoue | 370/328 |
| 2003/0043781 A1 | 3/2003 | Proctor et al. | |
| 2003/0224812 A1 | 12/2003 | Gassho et al. | |
| 2004/0008837 A1 * | 1/2004 | Sylvain | 379/265.09 |
| 2004/0053624 A1 * | 3/2004 | Frank et al. | 455/453 |
| 2006/0019653 A1 * | 1/2006 | Stamoulis et al. | 455/425 |

FOREIGN PATENT DOCUMENTS

| | | |
|---|---|---|
| EP | 1 098 489 A2 | 7/2002 |
| EP | 1 098 489 A3 | 7/2002 |
| TW | 200308157 A | 12/2003 |
| TW | 580813 | 3/2004 |
| TW | 588529 | 5/2004 |
| TW | 589832 | 6/2004 |
| TW | 200412766 A | 7/2004 |

OTHER PUBLICATIONS

3GPP, "3rd Generation Partnership Project; Technical Specification Group Core Network; IP Multimedia (IM) Subsystem Cx and Dx interfaces; Signaling flows and message contents (Release 5)", 3GPP TS 29.228 V5.8.0 (Jun. 2004), Technical Specification, pp. 1-50, and an attachment, referred to at p. 44 of the Technical Specification, entitled "CxDataType", pp. 1-4.
3GPP, "3rd Generation Partnership Project; Technical Specification Group Core Network; IP Multimedia Call Control Protocol based on Session Initiation Protocol (SIP) and Session Description Protocol (SDP); Stage 3 (Release 5)", 3GPP TS 24.229 V5.9.0 (Jun. 2004), Technical Specification, pp. 1-260.

* cited by examiner

*Primary Examiner*—Lester Kincaid
*Assistant Examiner*—Steven Lim

(57) ABSTRACT

After a wireless device registers with a wireless carrier, a registration process is initiated with a provisioning server. The provisioning server, based on at least one of a device identifier for the wireless device and an identifier of the wireless carrier, retrieves database information from a database. This information may be used by the provisioning server to decide whether to return (i) address information for a relay server which provides centralised management services or (ii) address information for an enterprise network.

23 Claims, 4 Drawing Sheets

SWITCH-IN OF CENTRALISED INFRASTRUCTURE FOR MANAGEMENT FOR WIRELESS COMMUNICATIONS

BACKGROUND OF INVENTION

An enterprise with a computer network may wish to provide its employees with access to the enterprise network using remote wireless devices. There are a variety of wireless network carriers serving different geographical areas. Historically, to provide enterprise network access by wireless devices, an enterprise could first determine the required geographic coverage. Next, the enterprise could identify one or more wireless carriers which, together, provide the required geographic coverage. The enterprise could then approach each of the identified carriers and arrange a private communication line between the enterprise network and the wireless carrier (often referred to as a leased line). Thereafter, wireless devices within the geographic scope of the wireless network of one of these wireless carriers could access the enterprise network using the wireless network and the communication line set up between the wireless network and the enterprise network.

An obvious drawback with this approach is that an enterprise that wished to allow wireless communication with the enterprise network over a broad geographic area must make, and maintain, arrangements with many different wireless carriers. Further, a message intended for a wireless device that was disconnected (e.g., off or not in any of the coverage areas) would need to be retained by the enterprise network. This is for the reason that it would not be known with which wireless carrier the wireless device would next register (consequent upon entering, or being turned on within, the coverage area of the wireless carrier). As an enterprise network may not be configured to handle, or to handle efficiently, undeliverable messages until they can be sent, this could prove problematic. Also, any given wireless device will normally be assigned a different (typically IP) address when entering each of the different wireless networks. It may fall on the enterprise network to keep a mapping to the current address of each wireless device.

To address these and other difficulties, a centralised infrastructure was conceived in order to provide centralised management services for wireless communications. Connections were negotiated between the centralised infrastructure and many different wireless carriers in order to provide comprehensive geographic coverage. Further, for an enterprise subscribing to the centralised management services, the centralised infrastructure will receive messages from the enterprise network intended for any wireless device, whether or not the wireless device is currently connected. Where a given wireless device is disconnected, the centralised infrastructure will store the message and forward it to the given wireless device whenever it next registers with one of the included wireless carriers. Additionally, the centralised infrastructure, by holding appropriate mapping tables, allows the enterprise network to communicate with each authorised wireless device no matter what address a given wireless carrier may assign to the wireless device. Yet further, historically, wireless carriers employ web-browser technology. As such, a message to a wireless device registered with a given wireless carrier is stored by the wireless carrier and must be actively retrieved from the wireless carrier by the wireless device. In contrast, using technology described in U.S. Pat. No. 6,701,378 issued Mar. 2, 2004 to Gilhuly et al., the contents of which are incorporated by reference herein, the centralised infrastructure may be configured to push the message onto a wireless device.

With the advent of virtual private networks (VPNs) over the public Internet, the need for a leased line between an enterprise and a wireless carrier has, in many instances, disappeared. This, together with inter-carrier agreements, may make it less difficult to ensure a broad geographic coverage even by concluding a service agreement with only one wireless carrier. Further, newer wireless carriers might employ push technology, might handle disconnects by storing and forwarding messages, and might off-load wireless device addressing problems from the enterprise network. With such high capability wireless carriers and inter-carrier agreements, the aforedescribed centralised infrastructure could become an unwanted added expense.

This invention seeks to ameliorate this potential problem.

SUMMARY OF INVENTION

After a wireless device registers with a wireless carrier, a registration process is initiated with a provisioning server. The provisioning server, based on at least one of a device identifier for the wireless device and an identifier of the wireless carrier, retrieves database information from a database. This information may be used by the provisioning server to decide whether to return (i) address information for a relay server which provides centralised management services or (ii) address information for an enterprise network.

According to the present invention, there is provided a method of handling communications, comprising: receiving from a wireless carrier network at least one of a wireless device identifier and a wireless carrier network identifier; based on at least one of said device identifier and said wireless carrier network identifier, retrieving database information from a database; based at least in part on said database information, returning one of (i) address information for a server which provides centralised management services and (ii) address information for an enterprise network. A computer readable medium is also provided which contains computer executable instructions which instructions, when executed by a processor of a provisioning server, cause the provisioning server to implement the described method.

In a further aspect, there is provided a provisioning server comprising: a database; a processor operable to: receive from a wireless carrier network at least one of a wireless device identifier and a wireless carrier network identifier; based on at least one of said device identifier and said wireless carrier network identifier, retrieve database information from said database; based at least in part on said database information, return one of (i) address information for a server which provides centralised management services and (ii) address information for an enterprise network.

Other features and advantages of the invention will become apparent from the following description in conjunction with the drawings.

BRIEF DESCRIPTION OF THE DRAWINGS

In the figures which illustrate example embodiments of the invention.

DETAILED DESCRIPTION

Figure 1:
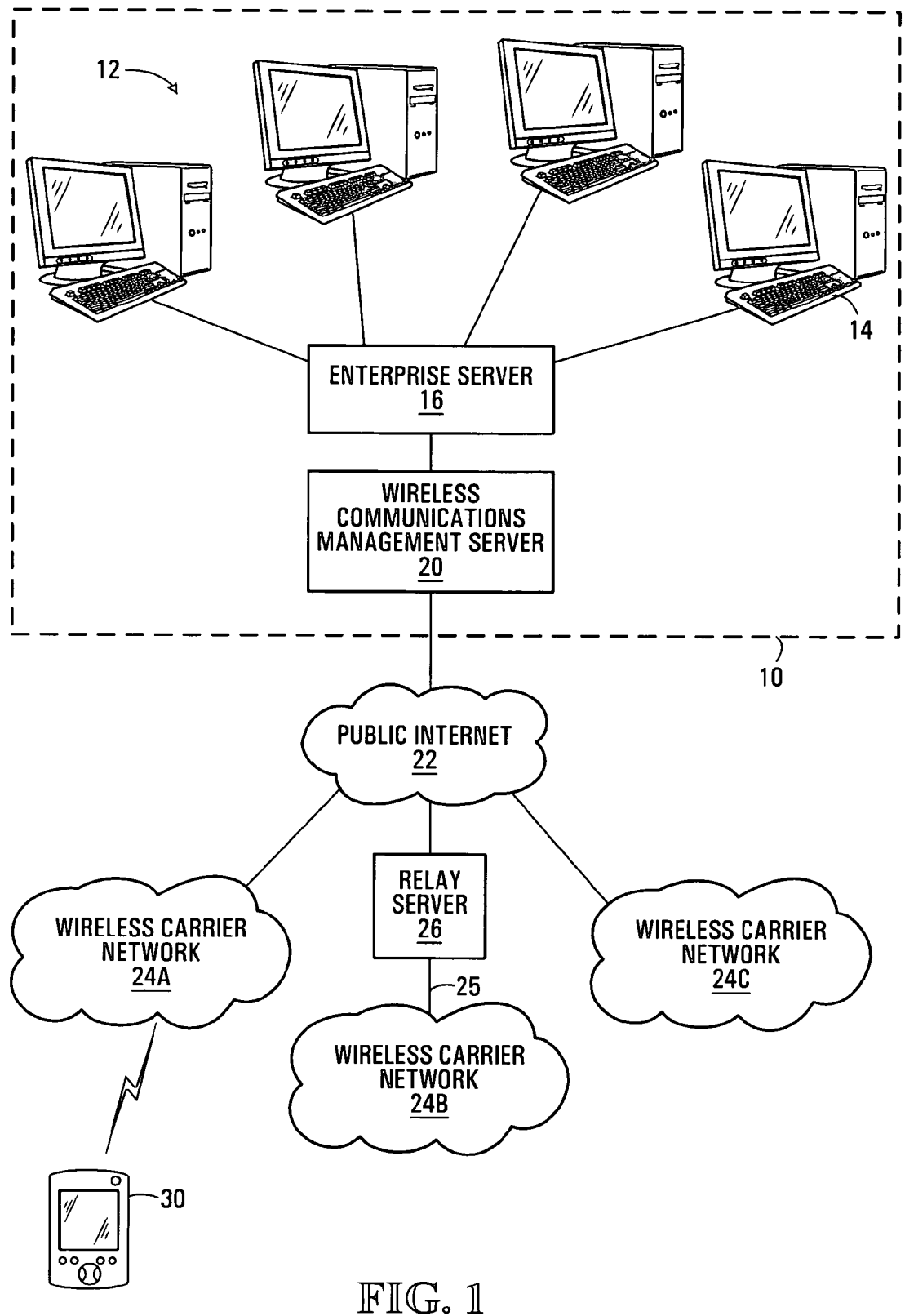
FIG. 1 is a schematic view of a known network configuration.

Turning to FIG. 1, an enterprise 10 has a hub and spoke enterprise network 12 with a number of communication devices 14 (such as suitably configured personal computers—PCs) connected to a central enterprise server 16. The enterprise server 16 is connected to the public Internet 22. A number of wireless carrier networks 24a, 24c operated by wireless carriers also connect to the public Internet as does a relay server 26. Additional wireless carrier networks, such as wireless carrier network 24b, are accessed by a leased line, such as line 25. Wireless communications devices 30 may be connected to one or other of the wireless carrier networks. Each of the wireless devices 30 may have become associated with enterprise 10. A wireless device may become associated with enterprise 10 by directly connecting the wireless device to a PC 14 of the enterprise network 12 while running an association process at the PC. The result is the uploading of a device identifier for the wireless device to the enterprise network and the downloading of an enterprise identifier from the network 12 to the wireless device. The device identifier, which may be referred to as a PIN, is a characteristic of each wireless device (i.e, a PIN is burned into each wireless device). The enterprise identifier, which may be referred to as a user ID, or UID, also normally does not change. Another characteristic of each wireless device is a home address.

To provide centralised wireless management services, the relay server 26 has an established communication path with a number of wireless carrier networks. Specifically, relay server 26 may have an established communication path with each of the wireless carrier networks 24a, 24c that is connected to the public Internet 22 through a VPN. Further each wireless carrier network accessible only over a private line will have a private line to the relay server 26. Thus, for example, wireless carrier network 24b has an established communication path with relay server 26 over leased line 25.

Enterprise 10 may take advantage of centralised management services for wireless communications by installing a wireless communications management server 20 with a connection between enterprise server 16 and the public Internet 22. The management server 20 provides the enterprise identifier (UID) and the current enterprise address to relay server 26. A database in the relay server is populated with the device identifiers along with the enterprise identifier and current enterprise address (namely, the address for the wireless communication server 20 of network 12 of enterprise 10).

With the described set-up, wireless communications management server 20 with relay server 26 may provide centralised management of wireless communications, as follows. When a wireless device 30 registers (in conventional fashion) with one of the wireless carrier networks 24a, 24b, 24c with which the relay server 26 has an established communications path, the device 30 will be provisioned with a (typically IP) wireless network carrier address. The device will send a registration message to its home address with its device identifier (PIN) and enterprise identifier (UID). The home address may point to the relay server or, more typically, to a registration server which re-directs the message to the relay server. This message which is received by the relay server 26 will include an indicator of the wireless carrier network. The wireless carrier network identifier could be implicit in the source address of the message (i.e., the wireless carrier network address) or may be explicitly contained in the message. On receiving this message, the relay server associates the wireless network carrier address with the PIN and returns a message to the wireless device with its own address. Any subsequent message sent by the wireless device 30 is addressed to the relay server. These subsequent messages may include a UID. Utilising the UID (received in the message or associated with the PIN at the relay server), the relay server looks up the appropriate enterprise address and forwards the message to network 12 via wireless communications server 20.

A message from enterprise network 12 intended for a given wireless device 30 is addressed by network 12 to the relay and includes the device identifier (PIN) of the wireless device. The message is forwarded to the relay server via wireless communications management server 20. If the relay server holds an association of the device identifier with a given wireless carrier network address, the message is forwarded to that wireless carrier network address. On the other hand, if there is no association, this indicates that the intended recipient wireless device is not currently connected to (i.e., registered with) any of the included wireless carrier networks. In such circumstances, the relay server simply stores the message until it becomes aware of an association of the recipient wireless device with one of the included wireless carrier networks.

From the foregoing, it will be apparent that the relay server allows the enterprise network to simply direct messages to all wireless devices to the relay. Further, the relay server allows messages to be stored for disconnected wireless devices until they are again connected to one of the wireless carrier networks (i.e., store and forward services). Additionally, the relay server allows connection through a number of wireless carrier networks, and hence broad geographic coverage, whereas the enterprise 10 need only administer a single arrangement with the centralised service.

It may be, however, that wireless carrier network 24c is upgraded so as to be able to provide one or more of services provided by the centralised service. For example, it may be connected to the public Internet and configured to do one or more of the following: store and forward messages, use PINs and UIDs in addressing messages between wireless devices and an enterprise, inter-operate with one or more other wireless carrier networks to communicate messages between an enterprise and wireless devices associated with the enterprise, and push messages to the wireless devices.

Figure 2:
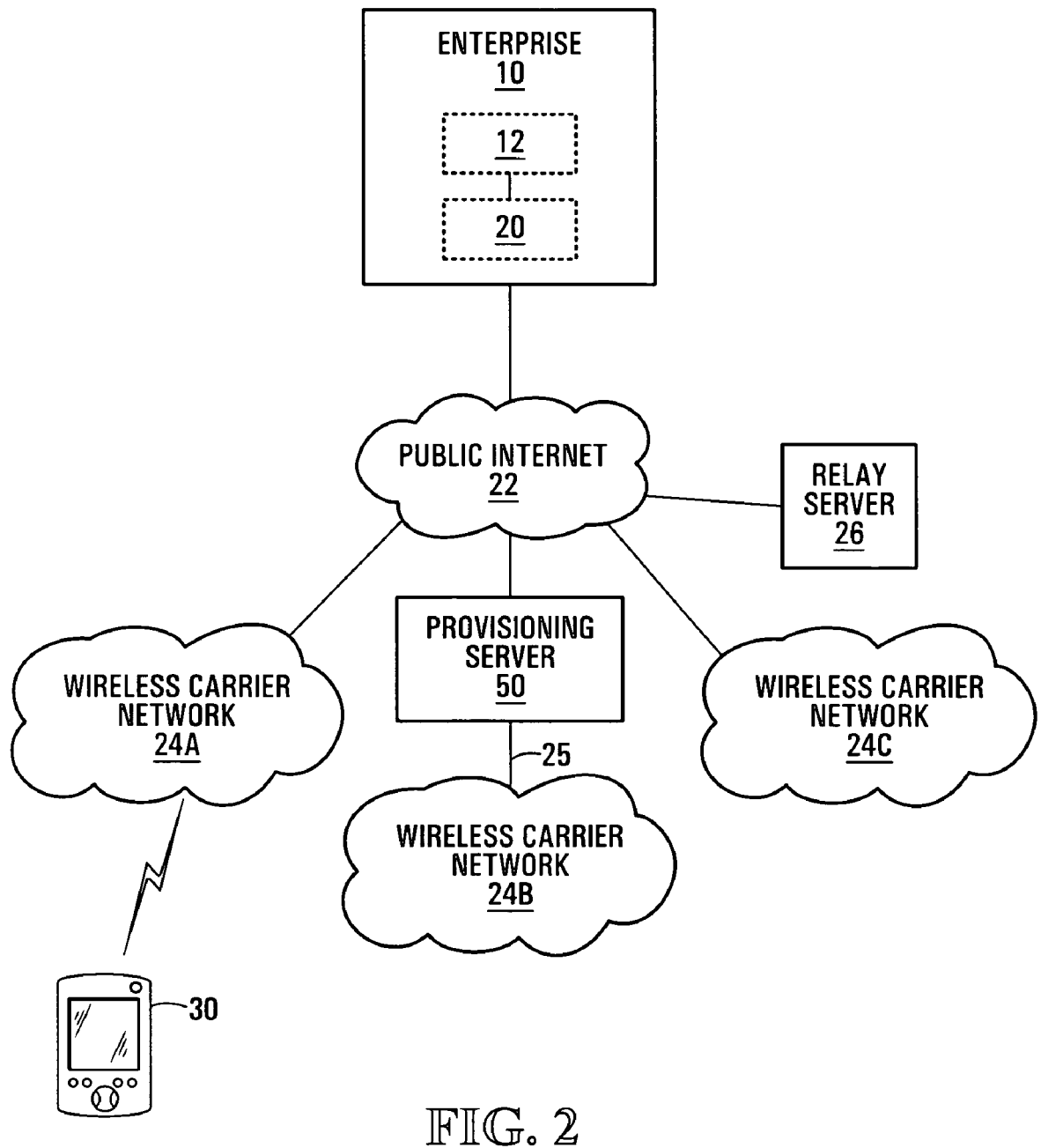
FIG. 2 is a schematic view of a network configuration, which embodies teachings of the subject invention.

To more inexpensively service a customer, the network configuration of FIG. 1 may be modified as illustrated in FIG. 2. Turning to FIG. 2, wherein like parts have been given like reference numerals, a provisioning server 50 is connected to the public internet 22—as is relay server 26. To provide the option of centralised management services, the provisioning server 50 (rather than relay 26) has an established communication path with a number of wireless carrier networks. Specifically, the provisioning server 50 may have an established communication path with each of wireless carrier networks 24a, 24c over the public Internet 22 through a VPN. Further, each wireless carrier network accessible only over a private line will have a private line to the provisioning server 50. Thus, for example, wireless carrier network 24b may have an established communication path with the provisioning server 50 over leased line 25. The relay server 26 has an established communication path with the provisioning server 50, as for example over the public internet 22 via a VPN. Further, where the home address of each wireless device points to a registration server, the registration server will be configured to re-direct it to the provisioning server. Alternatively, the registration server itself could act as the provisioning server. Where the home address points directly to the relay server, the provisioning server is substituted for the relay server so that the home address now points to the provisioning server.

Figure 3:
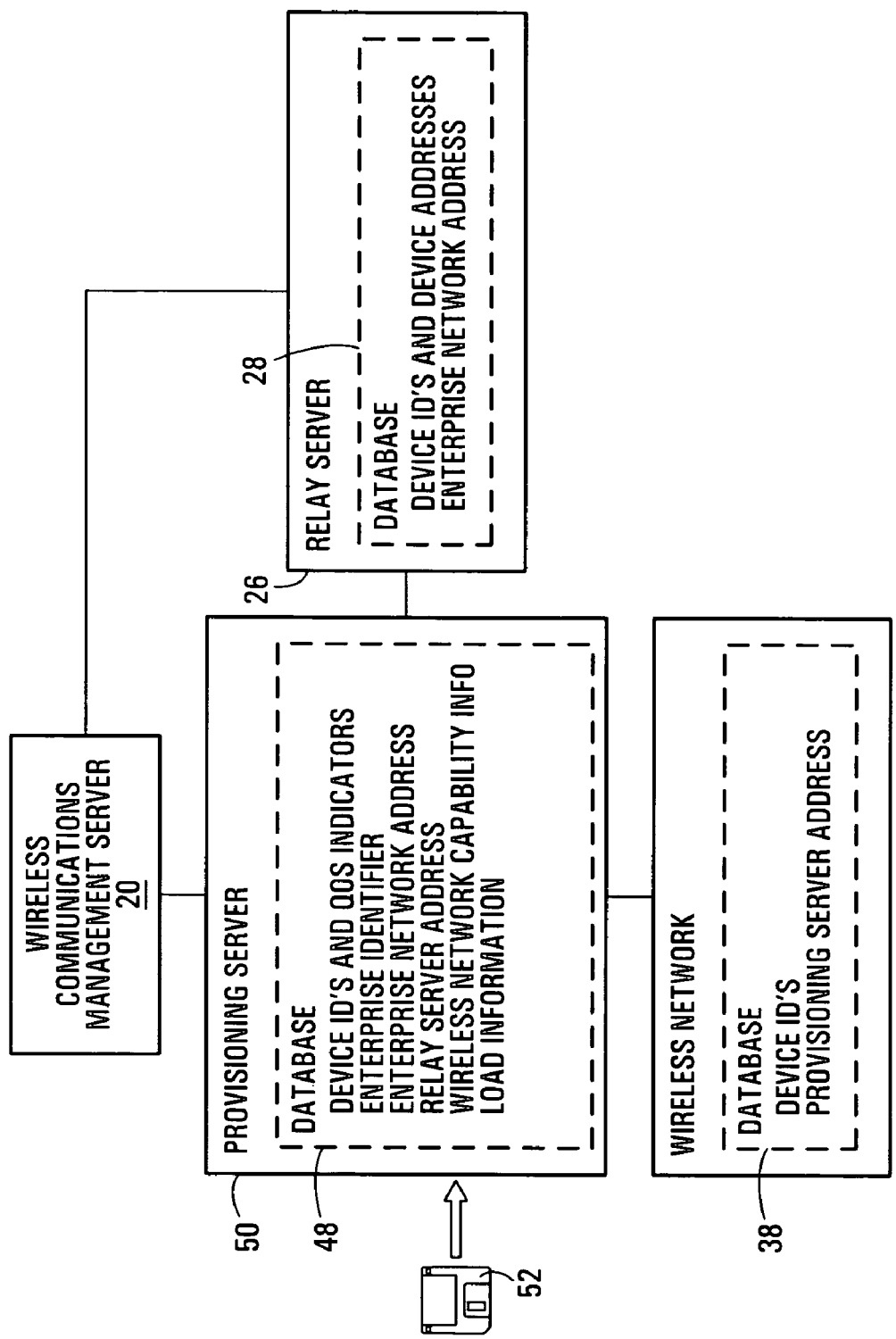
FIG. 3 is a schematic view of a portion of the network of FIG. 2.

With this set-up, and a wireless communications management server 20 installed in enterprise 10, the enterprise may be able to take advantage of centralised management services by providing its enterprise identifier, current enterprise address and the device identifiers of wireless devices currently associated with the enterprise. As illustrated in FIG. 3, the enterprise identifier (UID) and current address for enterprise network 12—and specifically, for wireless communications management server 20 of the enterprise network—populates a database 28 in the relay server 26 and a database 48 in the provisioning server. Each device identifier populates database 48 in the provisioning server 50. Additionally, a quality of service (QOS) indicator is associated with each device identifier and is stored in database 48 of the provisioning server 50. The QOS indicators are provided by an administrator of the centralised management services and each QOS indicator indicates the service level to which each wireless device is entitled (by virtue of the service plan subscribed to). Furthermore, the database 48 in the provisioning server is also populated with capability information for each wireless carrier network with which it has an established connection. For each wireless carrier network, this capability information includes an indication of (i) whether or not the wireless carrier network can store and forward messages, (ii) whether or not the wireless carrier network can use PINs and UIDs in addressing messages between an enterprise and a wireless device, (iii) whether or not the wireless carrier network interoperates with one or more other wireless carrier networks to communicate messages between an enterprise and wireless devices associated with the enterprise, and (iv) whether or not the wireless carrier network pushes messages to the wireless devices. During operation, the relay server 26 periodically sends load information to the provisioning server 50 which indicates the extent to which the capacity of the relay server is currently utilised. This load information is stored by the provisioning server in its database 48.

The provisioning server 50 may comprise a processor operating under program control. The program, and information for database 48, may be loaded from computer readable media 52, which media may be, for example, a computer readable diskette, a memory chip, or a file downloaded over a VPN on the public Internet.

Figure 4:
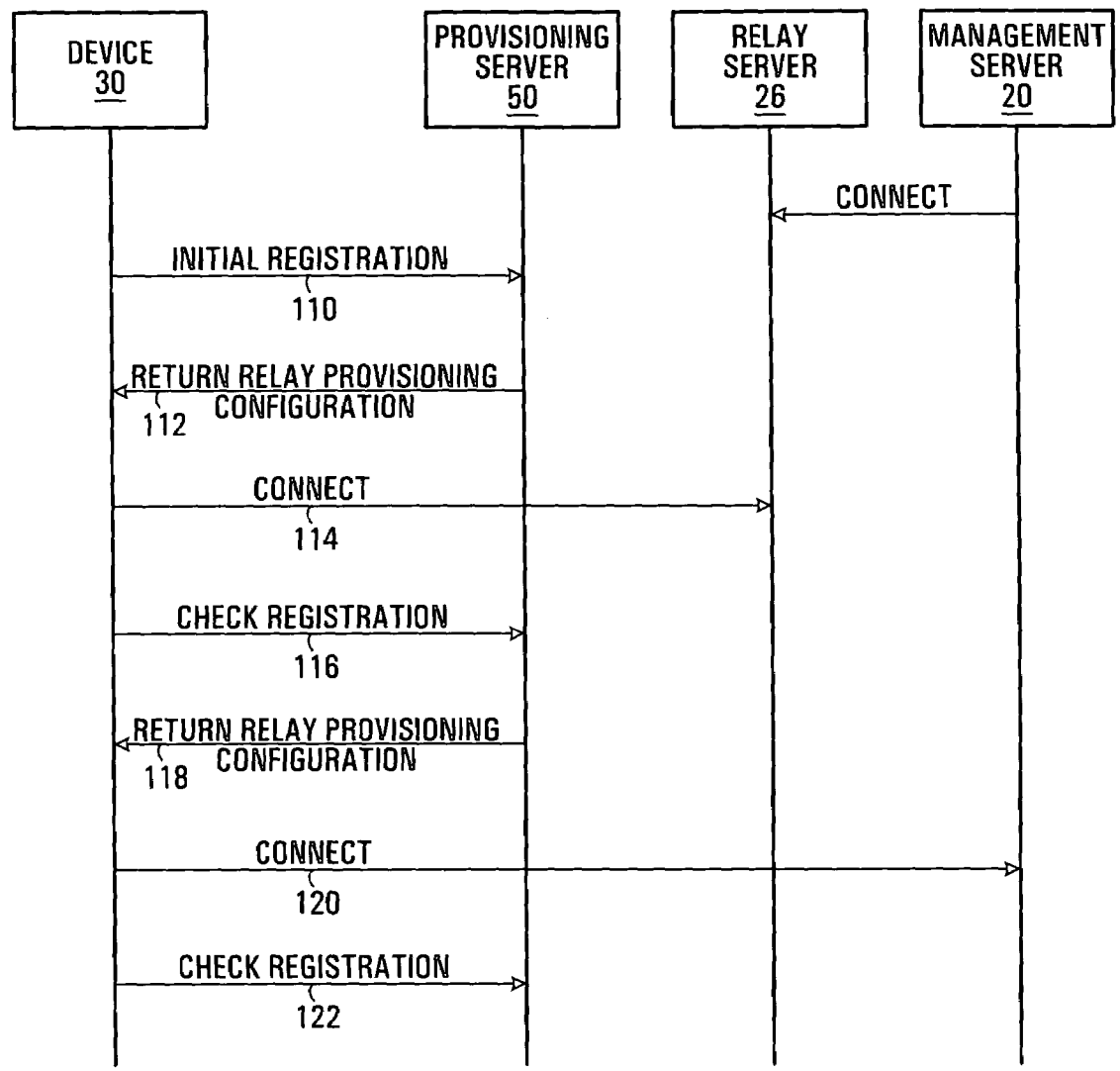
FIG. 4 is a sequence diagram showing operation of the system of FIG. 2.

As before, after a wireless device 30 registers with one of the wireless carrier networks 24a, 24b, 24c with which the provisioning server 50 has an established communications path, the device 30 sends a registration message with its device identifier to its home address. Now, however, this message is received by provisioning server 50. Consequently, with reference to FIG. 4, a registration (set-up) message 110 originating from device 30, which includes an identifier of the wireless carrier network, is sent to the provisioning server 50. As is typical with a registration message, the message includes not only the device identifier, but also information on the capabilities of the wireless device 30 itself.

The provisioning server 50 will then make a decision as to whether the wireless device 30 should utilise the centralised management services provided by relay 26 in communicating with the enterprise network (via wireless communications management server 20) or should communicate directly with the enterprise network 12 (via wireless communications management server 20). This decision is based on one or more of the following criteria: (i) the capabilities of the wireless carrier network with which the wireless device 30 has registered (as revealed by the wireless carrier network capability information of database 48); (ii) the current load on the relay server (based on the latest information received from the relay server in this regard and stored in database 48); (iii) the capabilities of the wireless device (as indicated in message 110); and (iv) the QOS to which the wireless device is entitled (as stored in database 48).

By way of example, a decision algorithm could provide a series of thresholds for load on the relay server and, associated with each higher load threshold, a higher QOS service level that must be subscribed to in order to be entitled to employ the relay 26. For communications entitled to employ the relay, a secondary operation of the decision algorithm could provide that if the wireless carrier network capability information indicated that the wireless carrier network was capable of providing services emulating those of the relay server 26, and the wireless device was capable of interfacing with the wireless carrier network to obtain such services, the wireless device is not entitled to employ the relay.

If, as a result of the decision algorithm, the wireless device 30 is entitled to use the relay server 26, the provisioning server addresses a message 112 to the wireless device including an address for relay server 26 and a time-out interval.

Assuming that message 112 does include an address for the relay server, the wireless device 30 will then address future messages, such as message 114, to the relay server and the relay server will associate the PIN for the device with the current wireless network carrier address of the device and handle communications between the wireless device and enterprise network 12 in the manner described hereinbefore.

The time-out interval prompts the wireless device to trigger a timer. When the timer times out, the wireless device is prompted to again register with the provisioning server by sending a message 116 to its home address. The manner of configuring a wireless device to operate in this fashion will be understood to those skilled in the art and is therefore not further described herein. The provisioning server therefore again decides whether the wireless device 30 should utilise the centralised management services provided by relay 26 in communicating with the wireless communications management server 20 of enterprise network 12 or should communicate directly with the enterprise network 12 (via wireless communications management server 20). It may be that, as a result of changed circumstances, such as increased load on the relay server, the decision algorithm indicates that the wireless device is not entitled to use the relay server. The provisioning server then returns a message 118 to the wireless device including an address for the wireless communications management server 20. In consequence, the wireless device is prompted to address future messages, as, for example message 120, directly to the enterprise network 12 (via wireless communications management server 20). Thus, future communications between the wireless communications management server 20 and wireless device 30 is done directly without relay 26 intervening. Message 118 will also include a time-out interval so that the wireless device is again prompted to re-register (via, for example, message 122), after a time interval.

The address of each of the provisioning server 50, the relay server 26, and the enterprise network 12 (i.e., the wireless communications management server 20) may be network addresses such as provisioner.central.com, relay.central.com, and enterprise.central.com. In such instance, a message which is sent to such a network address will be translated by a directory name server (DNS) on the public Internet to an Internet Protocol (IP) address (e.g., 123.456.789). Alternatively, these addresses may be IP addresses. However, in such instance, these addresses may need to be updated from time-to-time. In this case where, for example, the IP address of the wireless communications management server 20 changed, this would need to be communicated from the wireless communications management server 20 to the provisioning server 50. This may be accomplished by the network 12 passing its current address to the relay 26 which, in turn, passes this address to the provisioning server. The provisioning server would then be responsible to send an update message to any wireless devices currently communicating directly with the wireless communications management server 20.

The provisioning server and relay server could be co-located, or could both be implemented on a single server with appropriate software control. Further, while the exemplary embodiment has been described in conjunction with a single provisioning server and a single relay server, each could be, in actuality, a server farm.

Other modifications will be apparent to those skilled in the art and, therefore, the invention is defined in the claims.

What is claimed is:

1. A method of handling communications at a server, comprising:
    at a processor of said server:
    responsive to registration of a wireless device with a wireless carrier network, said wireless device being associated with an enterprise network, receiving from said wireless carrier network a wireless carrier network identifier identifying said wireless carrier network;
    based on said wireless carrier network identifier, retrieving database information from a computer database;
    based at least in part on said database information, returning one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

2. A method of handling communications at a server, comprising:
    at a processor of said server:
    receiving from a wireless carrier network at least one of a wireless device identifier for a wireless device associated with an enterprise network and a wireless carrier network identifier;
    based on at least one of said device identifier and said wireless carrier network identifier, retrieving database information from a computer database wherein said database information comprises capability information for said wireless carrier network defining one or more capabilities of said wireless carrier network;
    based at least in part on said capability information, returning to said wireless carrier network one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

3. The method of claim 2 wherein said capability information comprises an indication of whether or not the wireless carrier network can store and forward messages.

4. The method of claim 2 wherein said capability information comprises an indication of whether or not the wireless carrier network uses characteristic identifiers for wireless devices and enterprises in addressing messages.

5. The method of claim 2 wherein said capability information comprises an indication of whether or not the wireless carrier network inter-operates with one or more other wireless carrier networks to communicate messages between an enterprise and wireless devices associated with the enterprise.

6. The method of claim 2 wherein said capability information comprises an indication of whether or not the wireless carrier network pushes messages to the wireless devices.

7. The method of claim 2 wherein said receiving comprises receiving a registration message from said device.

8. The method of claim 7 wherein said returning comprises returning in a reply message addressed to a device associated with said device identifier.

9. The method of claim 8 wherein said reply message comprises an indicator to prompt a future set-up message from said device.

10. The method of claim 9 wherein said indicator indicates a time-out interval.

11. The method of claim 2 further comprising:
    receiving load information indicating load on said server which provides centralised management services; and
    storing said load information as database information in said database, and
    wherein said returning is also based in part on said load information.

12. The method of claim 11 further comprising:
    storing a plurality of device identifiers and, for each of said plurality of device identifiers, storing an associated service level indicator; and
    wherein said retrieving database information comprises retrieving a given service level indicator associated with said wireless device identifier such that said returning is based in part on said given service level indicator.

13. The method of claim 11 wherein said capability information is wireless network capability information and further comprising receiving device capability information and wherein said returning is also based in part on said device capability information.

14. A method of handling communications at a server, comprising:
    at a processor of said server:
    receiving from a wireless carrier network a wireless device identifier for a wireless device associated with an enterprise network along with device capability information;
    based on said device identifier, retrieving database information from a computer database;
    based in part on said database information, returning one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network;
    where said returning is also based in part on said device capability information.

15. A provisioning server comprising:
    a database;
    a processor operable to:
    responsive to registration of a wireless device, said wireless device being associated with an enterprise network, with a wireless carrier network, receive from said wireless carrier network a wireless carrier network identifier;

based on said wireless carrier network identifier, retrieve database information from said database;

based at least in part on said database information, return one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

16. A provisioning server comprising:

a database;

a processor operable to:

receive from a wireless carrier network at least one of a wireless device identifier for a wireless device associated with an enterprise network and a wireless carrier network identifier;

based on at least one of said device identifier and said wireless carrier network identifier, retrieve database information from said database wherein said database information comprises capability information for said wireless carrier network defining one or more capabilities of said wireless carrier network;

based at least in part on said capability information, return to said wireless carrier network one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

17. The server of claim 16 wherein said processor is further operable to:

receive load information indicating load on a server which provides centralised management services;

store said load information as database information in said database, and return to said wireless network said one of (i) address information for a server which provides centralised management services and (ii) address information for an enterprise network based also in part on said load information.

18. The server of claim 16 wherein said processor is also operable to:

store a plurality of device identifiers in said database and, for each of said plurality of device identifiers, store an associated service level indicator; and wherein said database information retrieved from said database comprises a given service level indicator associated with said wireless device identifier, such that returning said one of (i) address information for a server which provides centralised management services and (ii) address information for an enterprise network is based in part on said given service level indicator.

19. The server of claim 16 wherein said processor is also operable to return a time-out interval.

20. A provisioning server comprising:

a database;

a processor operable to:

receive from a wireless carrier network a wireless device identifier for a wireless device associated with an enterprise network along with device capability information;

based on said device identifier, retrieve database information from said database;

based in part on said database information and in part on said device capability information, return one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

21. A computer readable medium containing computer executable instructions which instructions, when executed by a processor of a provisioning server, cause said provisioning server to:

identify from a received message from a wireless carrier network at least one of a wireless carrier network identifier and a wireless device identifier for a wireless device associated with an enterprise network;

retrieve database information from a database based on at least one of said wireless carrier network identifier and said wireless device identifier, wherein said database information comprises capability information for said wireless carrier network defining one or more capabilities of said wireless carrier network;

based at least in part on said capability information, return to said wireless carrier network one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network based at least in part on said database information.

22. A method of handling communications at a server, comprising:

at a processor of said server:

responsive to registration of a wireless device with a first wireless carrier network, said wireless device being associated with an enterprise network, receiving from said first wireless carrier network at least one of a device identifier identifying said wireless device and a first wireless carrier network identifier identifying said first wireless carrier network;

based on at least one of said device identifier and said first wireless carrier network identifier, retrieving database information from a computer database wherein said database information comprises capability information for said first wireless carrier network;

based at least in part on said database information, returning one of (i) address information for a server which provides centralised management services including a service of pushing messages received for said wireless device to said wireless device and a service of storing messages intended for said wireless device when said wireless device is unreachable and forwarding stored messages to said wireless device when said wireless device becomes reachable and (ii) address information for said enterprise network.

23. The method of claim 22 further comprising:

upon subsequent registration of said wireless device with a second wireless carrier network, receiving from said second wireless carrier network at least one of said device identifier and a second wireless carrier network identifier identifying said second wireless carrier network;

based on at least one of said device identifier and said second wireless carrier network identifier, retrieving further database information from said database wherein said further database information comprises capability information for said second wireless carrier network;

based at least in part on said further database information, returning one of (i) address information for said server which provides centralised management services and (ii) address information for said enterprise network.

* * * * *